United States Patent [19]

Hipchen et al.

[11] 4,386,983

[45] * Jun. 7, 1983

[54] METHOD OF MAKING A FOAM STRUCTURAL LAMINATE

[75] Inventors: Donald E. Hipchen, Seminole; Michael J. Skowronski; Joseph R. Hagan, both of Clearwater, all of Fla.

[73] Assignee: The Celotex Corporation, Tampa, Fla.

[ * ] Notice: The portion of the term of this patent subsequent to Jun. 7, 1994, has been disclaimed.

[21] Appl. No.: 321,649

[22] Filed: Nov. 16, 1981

Related U.S. Application Data

[60] Division of Ser. No. 266,562, May 22, 1981, Pat. No. 4,346,133, which is a continuation-in-part of Ser. No. 79,771, Sep. 28, 1979, Pat. No. 4,284,683, which is a continuation of Ser. No. 886,110, Mar. 13, 1978, abandoned, which is a continuation of Ser. No. 745,169, Nov. 26, 1976, abandoned, which is a division of Ser. No. 650,243, Jan. 19, 1976, Pat. No. 4,028,158.

[51] Int. Cl.[3] ........................ B32B 31/14; B32B 5/28; B32B 5/20

[52] U.S. Cl. ...................................... 156/79; 156/164; 156/178; 156/229; 156/324; 156/499; 156/555; 264/45.3; 264/45.8; 264/46.3; 428/109; 428/110; 428/113; 428/159; 428/160; 428/213; 428/219; 428/220; 428/307.3; 428/317.9; 428/319.1

[58] Field of Search ............... 428/109, 110, 113, 158, 428/159, 160, 172, 213, 317.9, 319.1, 307.3, 220, 219; 156/78, 79, 178, 181, 163, 164, 229, 497, 499, 324, 555; 264/45.1, 45.3, 45.8, 46.3

[56] References Cited

U.S. PATENT DOCUMENTS

| | | | |
|---|---|---|---|
| 3,617,594 | 11/1971 | Willy | 428/320.2 X |
| 3,876,620 | 4/1975 | Moss | 428/319.1 X |
| 4,028,158 | 6/1977 | Hipchen et al. | 156/79 |
| 4,118,533 | 10/1978 | Hipchen et al. | 428/297 |
| 4,284,683 | 8/1981 | Hipchen et al. | 428/285 |

*Primary Examiner*—Robert A. Dawson
*Attorney, Agent, or Firm*—James W. Grace; Charles W. Vanecek

[57] ABSTRACT

A structural laminate comprises at least one planar facing sheet with a rigid foam attached to one surface of the facing sheet. The rigid foam may be any polymeric material which is capable of being foamed. Distributed substantially evenly throughout the foam is a mat of long glass fibers arranged in layers substantially parallel to the facing sheet. The process for producing this structural laminate comprises the steps of contacting a thin, substantially incompressible yet expansible mat of long glass fibers with a foam-forming mixture, positioning a facing sheet on each face of the mat, and passing the facing sheets having the mat and the foam-forming mixture therebetween through means for metering the amount of foam-forming mixture and causing it to fully penetrate between the fibers of said glass mat.

32 Claims, 4 Drawing Figures

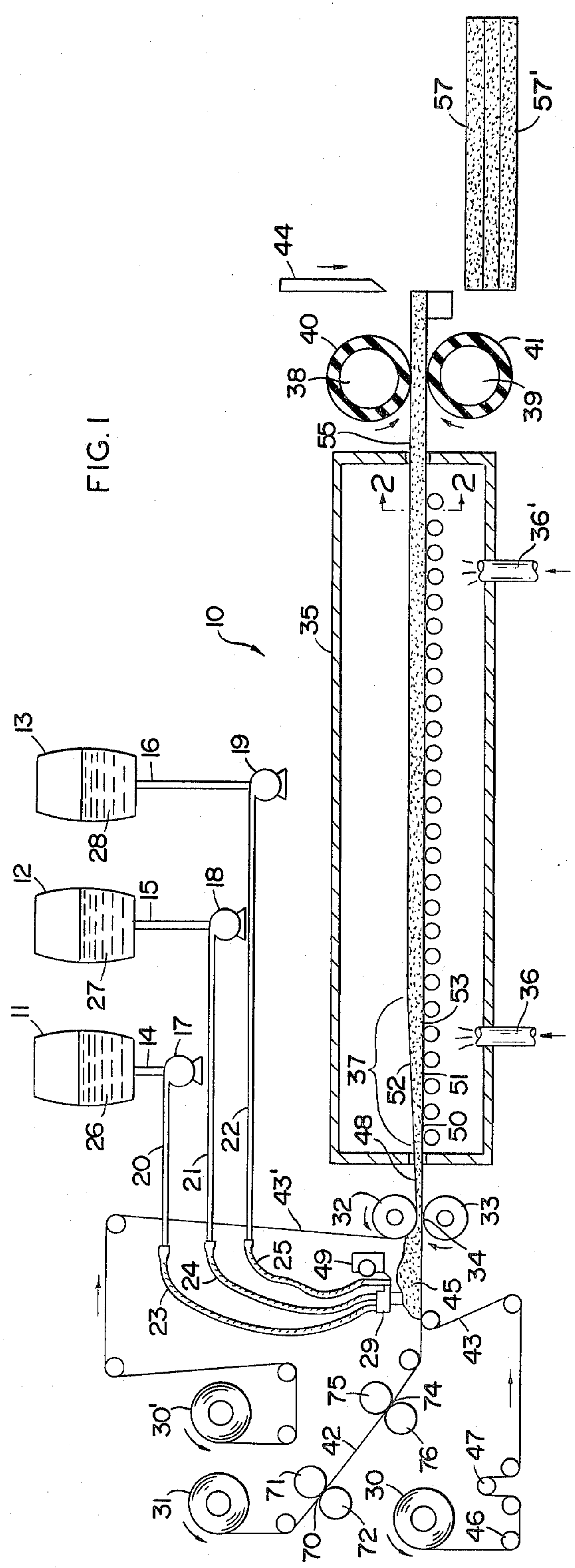
FIG. 1
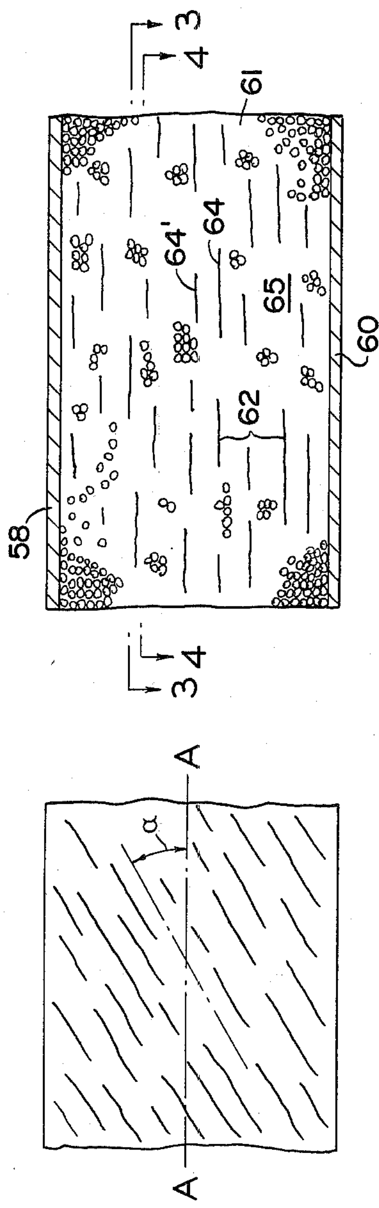
FIG. 2
FIG. 3
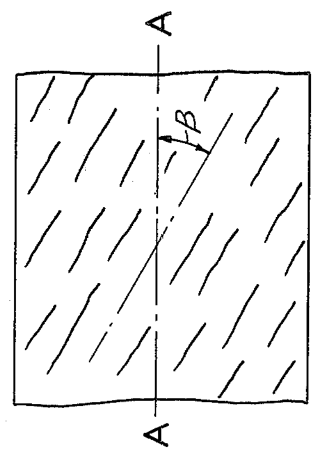
FIG. 4

METHOD OF MAKING A FOAM STRUCTURAL LAMINATE

This is a division of application Ser. No. 266,562, filed May 22, 1981, now U.S. Pat. No. 4,346,133 which is a continuation-in-part of Ser. No. 079,771, filed Sept. 28, 1979, now U.S. Pat. No. 4,284,683, which is a continuation of Ser. No. 886,110, filed Mar. 13, 1978, now abandoned, which is a continuation of Ser. No. 745,169, filed Nov. 26, 1976, also abandoned, which is a division of Ser. No. 650,243, filed Jan. 19, 1976, now U.S. Pat. No. 4,028,158.

BACKGROUND OF THE INVENTION

1. Field of the Invention

This invention relates to laminates and foam filled sheet products, both decorative and structural, and more particularly it relates to structurally rigid sheets of foam having glass fibers distributed substantially evenly throughout the foam. It also relates to a method for forming such a product.

2. Description of the Prior Art

The field of foamed resins is wide and the choice of resin is determined not only by cost and availability but also by properties such as flammability, friability, thermal conductance, appearance, ease in foaming and application and moisture resistance. And it is, of course, well-known to include fillers and additives to alter the properties of the foamed material.

Many attempts have been made to create structural laminates, particularly of foamed resins to be used for purposes of insulation as well as for wall and ceiling panels. Laminates have often been limited in the choice of foamed resins for this reason. Alternatively, foamed resins which are unsatisfactory in respect to certain properties have been made acceptable by the use of additives. These additives or fillers had have various disadvantages such as the toxic nature of halogen and/or phosphorus containing fire retardant additives. Self-supporting foamed laminates, such as the polystyrene and polyvinyl chloride, are also well-known, but have low structural strengths which limit the use of such laminates.

Laminates employing a core of batting material are also known in the art. Typically such materials suffer discontinuities and structural weaknesses.

It is therefore an object of this invention to create a strong laminate which is free of discontinuities.

It is a further object of this invention to form a laminate utilizing a foamed polymeric resin with a mat of long glass fibers to form a unique laminate of superior performance and of pleasing appearance.

Before laminates of this type can be used, however, it is necessary that they meet structural and fire safety standards.

Previous attempts to make similar structures utilizing foams have relied on the spongy character of a high loft batting into which a foam-forming resin was forced and then permitted to foam and expand at the same rate as the high loft fibrous batting material expanded. An example of this process applied to making a flexible foam filled batting material can be found in U.S. Pat. No. 3,617,594.

A distinct disadvantage is presented by using a high loft batting in that the batting may elastically recover faster than the foam-forming mixture expands, thereby producing voids or pockets within the resultant material, the pockets contributing directly to possible structural failure of the material when subjected to high heat conditions.

It is therefore an object of this invention to form a structural laminate using a low loft mat of long glass fibers, the mat being thin, substantially incompressible, yet expansible under the sole influence of the expansion of a foam-forming mixture which penetrates and completely fills the interstices between the fibers of the mat.

It is another object of this invention to create a structural laminate having improved fire resistant properties.

It is yet another object of this invention to produce a structural laminate having superior fire resistant properties, which would qualify for approval by the Factory Mutual Research Corporation, an independent risk certification firm.

A method of making a low loft mat which satisfies the functional and structural requirement of this invention is to be found in U.S. Pat. No. 2,609,320, provided certain limitations are placed on the method. For example, in a mat acceptable for use in a laminate according to this invention, the glass fibers are attached to one another by an amount of fiber binder sufficient to make the mat of glass fibers dimensionally stable but insufficient to fill the interstices between the glass fibers. Preferably, only a minimum amount of this fiber binder should be employed. Further, the mat should not be expanded or puffed up in thickness as is taught in U.S. Pat. No. 2,609,320 but rather should be of low loft such that pressure applied to the faces of the mat will not substantially reduce the thickness of the mat and such that the mat does not elastically recover to any appreciable amount when the pressure is released from the faces of the mat. Of course, any other method can be used which would result in a batt of glass fibers having a structure substantially the same as that produced by the method of U.S. Pat. No. 2,609,320 with these restrictions.

SUMMARY OF THE INVENTION

The structural laminate of the present invention has at least one but preferably has two facing sheets, one on either side of the foam core. These facing sheets can be constructed of a wide variety of non-flammable materials such as asbestos, glass fibers, metals, fire retardant papers, and composites thereof. In the broadest aspects of the invention, any metal can be employed such as copper, brass, iron, steel, or aluminum. Aluminum is the preferred metal because of its ductility and ease with which it can be manufactured into a material of suitable thickness.

Attached to one surface of the at last one facing sheet is a rigid foam formed from a foam-forming mixture. The foam-forming mixture is one which will result in a rigid foam.

Polyurethanes, polyisocyanurates, and phenolic polymers are well-known materials in laminates in that they encompass many desirable properties for use in laminates, particularly structural laminates. Other polymers that can be foamed include, rubber, polyvinyl chloride, urea-aldehydes, melamine-aldehydes, polystyrene, polypropylene, polyethylene, cellulose acetate, epoxy resin, acrylonitrile-butadiene-styrene-copolymer and silicones.

Suitable foaming resin compositions are disclosed in U.S. Pat. Nos. 2,577,277, 2,498,621, 2,572,568, 2,623,023 and 2,461,942. Other foamable resin compositions may be used.

Foaming resin compositions contain blowing agents which give gases when heated to proper temperatures such as carbon dioxide, ammonium carbonate, potassium carbonate, hydrogen peroxide and chlorinated and fluorinated hydrocarbons such as fluorotrichloromethane.

Catalysts, surfactants, dyes and other special additives may be added to the composition as is well-known in the art in order to effect certain properties. Surfactants, such as polyoxyethylene-sorbitan monopalmitates, polyoxyethylene sorbitan polydimethyl siloxane and polydimethyl siloxane polyoxyalkylene block copolymers, can serve as wetting agent in adhering fibers to foam and can affect the foam cell size by lowering surface tension.

The structural laminate is produced by contacting a thin, substantially incompressible yet expansible mat of glass fibers with a foam-forming mixture. The facing sheets are positioned on each face of the mat and the unit of foam-forming mixture and mat contained between the facing sheets is passed through means for metering the amount of foam-forming mixture and causing it to fully penetrate between the fibers of said glass mat, as, e.g., through the nip of two rotating rolls, the nip between a doctor blade and a fixed plate, etc. The mat of glass fibers is distinguished by having the fibers arranged in layers, and the fibers within each layer are long, and at an angle to the fibers in each next adjacent layer.

The structural laminates of the present invention are made from a mat of long, generally straight glass fibers. The fibers of the mat are arranged in substantially evenly distributed layers, the layers being substantially parallel to one another. Within each layer, each of the glass fibers extends in a generally straight direction and is roughly parallel to the other fibers of the layer. Advantageously, the direction of the glass fibers in each layer is at an angle to the direction of the glass fibers in each next adjacent layer, as, e.g., at an acute or a 90 degree angle. The glass fibers are not short but rather long, generally having a length greater than one foot and preferably 5 to 12 feet. One or more fiber layers may comprise a plurality of long fibers which are substantially evenly distributed in a fiber aggregate having a greater than one fiber thickness in the horizontal plane. Intermingled with the glass fibers is a relatively minor proportion of a binder, such as poly(vinyl acetate) or preferably a silane modified polyester binder amounting to about 2 to 10 percent by weight of the combined glass fiber and binder. The glass fiber mat having this amount of fiber binder is dimensionally stable yet is expansible under the influence of the expansion of any foam-forming mixture caused to penetrate into the interstices between the fibers of the mat.

The glass fiber mat is incorporated into the structural laminate in an amount which will insure the continued structural integrity of the laminate when it is exposed to high temperature and open flames yet not so much as to result in the deterioration of the surface of the structural laminate due to exposed single fibers. The glass fiber mat is functionally effective when included in the range of 1–24 gms/board foot of structural laminate. A structural laminate preferably comprises 2–20 gms of glass fiber mat per board foot of structural laminate.

A particularly suitable process for producing a structural laminate according to this invention comprises the steps of contacting the previously formed, thin, substantially incompressible yet expansible mat of long glass fibers with a foam-forming mixture as outlined above, placing a facing sheet in contact with at least one face of the mat, and passing the facing sheet, mat and foam-forming mixture through means for metering the amount of foam-forming mxiture and causing it to fully penetrate between the fibers of said glass mat, as, e.g., between the nip of two rotating rolls, thereby forcing the foam-forming mixture into the interstices between the glass fibers of the mat. The facing sheet, mat, and foam-forming mixture then pass into an expansion zone wherein the foam-forming mixture expands under the influence of heat generated in exothermic reaction between the components of the foam-forming mixture. The layers of the fibers in the mat separate under the influence of the expansion of the foam-forming mixture and are distributed throughout the foam but maintain their same relative order. The foam-forming mixture having the glass fibers distributed substantially evenly therethrough is subjected to the influence of heat controllably added by the circulation of hot air between 100° F. and 350° F., preferably 150° F. and 250° F., and cured to a rigid foam structural laminate, the rigid foam completely filling the interstices between the glass fibers. This rigid structural laminate is then periodically severed into finite lengths thereby forming discrete panels.

According to another aspect of the present invention it has been discovered that stretching of the mat of glass fibers by a certain amount aids in the production of a structural laminate having a more uniform distribution of the glass fibers throughout the foam. The stretching can be performed in a direction parallel to the running length of the mat. The stretching is accomplished by an amount sufficient to rupture only some of the fiber to fiber bonds and is generally between one and ten percent, based upon the length of the mat prior to stretching. In a particularly advantageous embodiment of the invention, it has been found that rupture of the fiber bonds can be accomplished by stretching the mat of glass fibers in a direction transverse of perpendicular to the running length of the mat, as, e.g., by passing the mat of glass fibers through a pair of intermeshing corrugated rolls, such as those described in U.S. Pat. No. 4,087,226.

The laminates may be used for decorative panels in which case one side of the laminate is decorated or embossed. However, both facing sheets may be decorated.

BRIEF DESCRIPTION OF THE DRAWINGS

FIG. 1 is a schematic representation of an apparatus suitable for practicing the process of the present invention.

FIG. 2 is an enlarged sectional view of a structural laminate taken along line 2—2 of FIG. 1.

FIG. 3 is a plan view of the structural laminate of FIG. 2 taken along the line 3—3 of FIG. 2.

FIG. 4 is a plan view of the structural laminate of FIG. 2 taken along the line 4—4 of FIG. 2.

DESCRIPTION OF THE PREFERRED EMBODIMENTS

In FIG. 1 there is shown schematically an apparatus 10 suitable for use in connection with the present invention. The apparatus 10 comprises tanks 11, 12 and 13 for containing the foaming ingredients and additives such as blowing agent, surfactant, etc., each respectively connected to outlet lines 14, 15, and 16. The lines 14, 15 and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower facing sheet material 43, a roll 30' of upper facing sheet material 43', and a roll 31 of glass fiber mat material. The apparatus 10 is also provided with metering rolls 32 and 33 and an oven 35 provided with vents 36 and 36' for introducing and circulating hot air. The apparatus 10 is also provided with pull rolls 38 and 39 each of which preferably has a flexible outer sheath 40 and 41. The apparatus 10 is also provided with cutting means 44 for severing the structural laminate produced by this process into finite lengths thereby producing discrete panels.

In operation, the tanks are charged with the foam-forming mixture in whatever manner is convenient and preferred for the specific polymer. For instance, for a urethane foam, the polyol can be in one tank, the polyisocyanate in another and catalyst in a third. Other polymers such as polyvinyl chloride can be used as a dispersion in plasticizers and a blowing agent introduced. Or polyvinyl chloride can be extruded as can polystyrene, cellulose acetate and the polyolefins among others. Rubber and urea-formaldehyde can be frothed and admixed with the appropriate blowing agent and surfactant. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25 whereupon they are mixed in the mixing head 29 to form the foam-forming mixture 45 which contacts the thin, substantially incompressible yet expansible mat of glass fibers 42 fed from the roll of glass fiber mat 31 toward the nip 34 between the two rotating metering rolls 32 and 33.

By virtue of rotation of the pull rolls 38 and 39, the lower facing sheet 43 is pulled from the roll 30, the upper facing sheet 43' is pulled from the roll 30', and the glass fiber mat 42 is pulled from the roll 31. The facing sheets 43 and 43' having the mat 42 and foam-forming mixture 45 therebetween pass through the nip 34 of the two rotating metering rolls 32 and 33. The mixing head 29 is caused to move back and forth, normal to the running length of the mat by virtue of a reciprocating means 49. In this manner, an even amount of foam-forming mixture 45 can be maintained upstream from the nip 34 and in contact with the mat of glass fibers 42. The mat of glass fibers being substantially incompressible yet expansible has such a low loft that the pressure applied to the mat 42 by the rotating rolls 32 and 33 does not substantially reduce the thickness of the mat 42 but rather the foam-forming mixture 45 is caused to penetrate and completely fill the interstices between the glass fibers forming the mat 42. Further, the mat 42 is of such a low loft that after passing through the nip 34 the glass fibers do not themselves elastically recover but expand under the sole influence of the expansion of the foam-forming mixture 45. The velocity of the mat 42 as it passes between the nip 34 of the two rolls substantially equals the velocity of the facing sheets 43 and 43'. After passing between the nip of the two rolls 32 and 33, the composite structure 48 now comprises a lower and upper facing sheet 43 and 43' having therebetween a glass fiber mat 42 completely permeated by the foam-forming mixture 45 which wets the glass fibers of the mat 42.

This composite structure 48 now passes into oven 35 and while in the oven 35 the foam-forming mixture expands in an expansion zone 37. This expansion is initiated by heat generated in an exothermic reaction between the components 26, 27, and 28 of the foam-forming mixture 45 and is regulated by heat added to the oven 35 by the hot air from vent 36 and 36'. The temperature within the oven 35 is controlled by varying the temperature of the hot air from vent 36 and 36' in order to insure that the oven temperature is maintained within the desired limits necessary to cure the foam employed, as, e.g., from 100° F. to 350° F. and preferably 150° F. to 250° F. While in the expansion zone 37 the layers of fibers 50 of the glass fiber mat separate under the influence of the expanding foam 53 in such a manner as to be evenly distributed throughout the foam 53 in planes substantially parallel to the plane of the facing sheets 51 and 52.

The foam 53, under continuing influence of the heat added to the oven 35 by the controlled introduction of hot air from vent 36 and 36', cures to form the structural laminate 55 of this invention. The structural laminate 55 then leaves the oven 35, passes between the pull rolls 38 and 39, and is cut by cutting means 44 into finite lengths thereby forming discrete panels 57 and 57' of the structural laminate 55.

In FIG. 2 there is shown an enlarged sectional view of a structural laminate 55 of the present invention taken along line 2—2 of FIG. 1. The structural laminate 55 shown in FIG. 2 comprises two facing sheets 58 and 60. It will be appreciated by persons of ordinary skill in the art that a structural laminate of this type can be made in such a manner as to only have a single facing sheet, or one of the facing sheets 58 or 60 can be removed from the structural laminate without seriously degrading the desired functional performance. The structural laminate 55 shown in FIG. 2 further comprises a rigid foam 61 formed from the foam-forming mixture 45 of FIG. 1. Distributed substantially evenly throughout the foam 61 is a multitude of long glass fibers 62 arranged in layers 64, 64' which are substantially parallel to the facing sheets 58 and 60. The rigid foam 61 completely fills the interstices 65 between the glass fibers 62. The glass fibers in each layer 64, 64' are at an acute angle to the glass fibers in each next adjacent layer. This is shown schematically by examining two adjacent sections, the first along line 3—3 and shown in FIG. 3 and the second along line 4—4 shown in FIG. 4. In the two FIGS. 3 and 4, a plan view of the structural laminate of FIG. 2 is shown with reference lines A—A representing the same direction in the two figures. In FIG. 3 the glass fibers 62 are shown to be running predominantly at an angle $\alpha$ to the reference line A—A while in FIG. 4 the glass fibers 62 are shown to be running predominantly at an angle $\beta$ with respect to reference line A—A. The fibers in these two adjacent layers represented by the sections shown in FIGS. 3 and 4 are aligned such that the fibers in one layer are at an angle of $\alpha$ plus $\beta$ with respect to the fibers in the next adjacent layer. The angle $\alpha$ plus $\beta$ is generally an acute angle and is typically less than 60° in a structural laminate produced according to this invention. While each of the glass fibers 62 lies in a generally straight direction over its course through the structural laminate, it deviates about this straight-line course throughout its length. Undulations or other deviations of the fibers 62 within the plane layers 64, 64', which are substantially parallel to the facing sheet or sheets 58, 60, come about in a number of ways. For example, slight non-contiguous undulations are induced in the fibers 62 as the foam-forming mixture 45 expands and disperses the fibers 62 throughout the laminate 55. Additionally, stretching of glass fiber mat 42, as, e.g., by passing it through intermeshing corrugated rolls, causes deviations from straightness in the fibers 62 of the glass mat. The overall layered arrangement of the glass fibers within the structural laminate of the invention is nevertheless maintained despite these various fiber disorienting processing conditions.

The overall thickness "d" of a laminate 55 produced according to this invention is typically from 0.4 to 4.0 inches while the initial thickness of the glass fiber mat 42 is less than 0.1 inches and more typically 0.010 to 0.050 inches. The initial thickness of the glass fiber mat 42 is generally less than 1 and ½ times the separation of the facing sheets at the nip 34 of the two rotating rolls 32 and 33, the low loft of the mat 42 preventing any substantial compression by the two rolls 32 and 33.

An apparatus by which stretching of the fiber mat is accomplished is shown in FIG. 1. As shown in FIG. 1 the mat 42 passes first between the nip 70 of a first pair of rolls 71, 72 and then through the nip 74 of a second pair of rolls 75, 76. The axes of the rolls 71, 72, 75, 76 are perpendicular to the running length of the mat 42. The nips 70, 74 of each pair of rolls 71, 72 and 75, 76 engage the mat 42. The peripheral speed of the second pair of rolls, namely, rolls 75, 76, is greater than the peripheral speed of the first pair of rolls, namely, the rolls 71, 72. The difference in peripheral speed is adjusted such that stretching of the mat 42 is accomplished in the running or machine direction. This direction is parallel to the running length of the mat 42. An alternative to the arrangement of the two pairs of rolls is to provide the roll 31 with a brake which slows the advance of the mat 42 from the roll 31 as the mat 42 is pulled by the rolls 32, 33. Another and more desirable alternative for stretching of the fiber mat is to pass it through intermeshing corrugated rolls which effect a transverse stretching. Although this technique can be accompanied by heightened fiber disorientation in the mat, the layered pattern of the fibers in the mat is preserved and, after foam expansion and cure, there is obtained a rigid foam structural laminate of the invention having long glass fibers which are arranged in layers and are distributed substantially evenly throughout the rigid foam.

A desirable phenolic foam-forming mixture for use in the present invention is disclosed in U.S. Pat. No. 3,876,620, this patent being hereby incorporated by reference. It contains as one component an improved alkylol group containing phenolic polymer of Formula I:

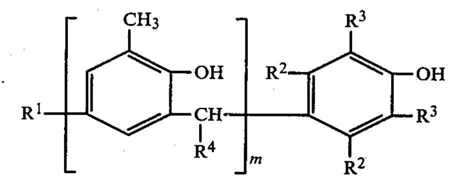

(I)

wherein $R^1$ is $$\mathrm{HOCH}\!-\!,\ \text{with } R^4 \text{ on the CH}$$

hydrogen, or a radical of Formula II:

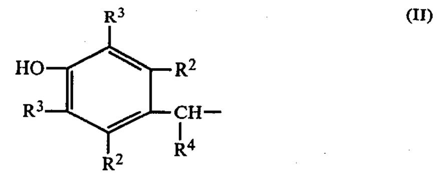

(II)

The $R^2$'s are independently selected from the group consisting of lower alkyl, phenyl, benzyl, halo, nitro, and hydrogen. The $R^3$'s are independently selected from the group consisting of $$\mathrm{HOCH}\!-\!,\ \text{with } R^4 \text{ on the CH}$$

hydrogen, or a radical of Formula II.

The $R^4$'s are independently selected from the group consisting of lower alkyl, hydrogen, phenyl, benzyl, or furyl. By furyl is meant the radical introduced by the use of furfural. In Formula I, m is an integer from 2 to 10 inclusive and is preferably an integer from 2 to 6 inclusive. The phenolic polymers generally have a molecular weight between 200 and 2,000 and preferably have a molecular weight between 300 and 1500.

A preferred subclass of phenolic polymers are those of Formula III:

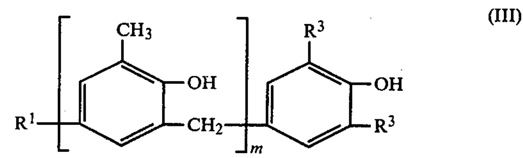

(III)

In Formula III, $R^1$ is $HOCH_2$—, hydrogen, or a radical of Formula IV:

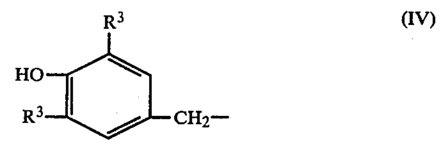

(IV)

The $R^3$'s are independently selected from the group consisting of $HOCH_2$—, hydrogen, or a radical of Formula IV.

In a preferred embodiment at least one of the $R^3$'s is methylol, i.e., $HOCH_2$—. Of course, such methylol groups or, when the aldehyde is other than formaldehyde, alkylol groups, are automatically introduced into the polymer as is well known in the art by the process described below.

The phenolic polymer can contain widely varying ratios of the radicals of Formula II or IV to ortho-cresol units. However, this ratio is generally from 1:3 to 3:1 and is preferably from 1:1.5 to 1.5:1.

The phenolic compositions used to form a cellular material comprise the phenolic polymer of Formula I or Formula III, together with a compound of Formula V:

(V)

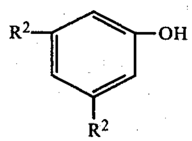

The compound of Formula V can be present in the phenolic composition in widely varying ratios but is generally present in a weight ratio of 1:30 to 1:2 and is preferably present in a weight ratio of 1:20 to 1:5. Examples of suitable compounds of Formula V include among others: m-cresol, m-chlorophenol, m-nitrophenol, 3,5-xylenol, and phenol, i.e. hydroxy benzene. Phenol is the most preferred compound of Formula V because of cost, availability, and reactivity.

Any aldehyde can be employed. Examples of suitable aldehydes include, among others, furfural, benzaldehyde, and acetaldehyde. Formaldehyde is the preferred aldehyde. Formaldehyde can be employed in widely varying forms such as the 37% aqueous solution widely known as formalin. However, it is generally necessary to remove from the polymeric material the water introduced with the formalin. Formaldehyde is preferably employed in the form of paraformaldehyde which contains much less water.

The cellular material is formed by simply reacting the alkylol group containing phenolic polymer of Formula I or Formula III and the compound of Formula V under conditions such that a cellular product will result. As is well known in the phenolic foam art, the reaction can be conducted in the presence of a foaming catalyst, a blowing agent, and a surfactant.

Any catalyst which will enhance the cross-linking and foaming reaction can be employed in the present invention. However, the preferred foaming catalysts are aromatic sulfonic acids, examples of which include, among others, benzene sulfonic acid, toluene sulfonic acid, xylene sulfonic acid, and phenol sulfonic acid. Phosphoric acid can also be employed either alone or in admixture with the sulfonic acids. The preferred sulfonic acid is a mixture of equal parts by weight of toluene sulfonic acid and xylene sulfonic acid, as described in Mausner et al. U.S. Pat. No. 3,458,449. Another foaming catalyst which has been found to give excellent results is a blend of toluene sulfonic acid, phosphoric acid, and water in a weight ratio of 35-50:50-35:15.

The catalyst is generally present in the minimum amount that will give the desired cream times of 10 to 50 seconds and firm times of 40 to 500 seconds to the reacting mixture. The catalyst, however, generally comprises from 0.5 to 20, and preferably comprises from 1.0 to 15, weight percent based on the weight of the cellular material.

Any blowing agent characteristically employed in similar prior art products can be employed in the composition of the present invention. In general, these blowing agents are liquids having an atmospheric pressure boiling point between minus 50° and 100° C. and preferably between zero and 50° C. The preferred liquids are hydrocarbons or halohydrocarbons. Examples of suitable blowing agents include, among others, chlorinated and fluorinated hydrocarbons such as chloroform, trichlorofluoromethane, $CCl_2FCClF_2$, $CCl_2FCF_3$, diethylether, n-pentane, cyclopentane, and 2-methylbutane. A 1:1 weight ratio mixture of trichlorofluoromethane and $CCl_2FCClF_2$ is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperatures until mixed with the other components.

Successful results have been obtained with silicone-/ethylene-oxide/propylene-oxide copolymers as surfactants. Examples of suitable surfactants include, among others, alkoxy silanes, polysilylphosphonates, polydimethyl siloxane, and polydimethyl-siloxane-polyoxyalkylene copolymers.

Examples of specific, commercially available surfactants include, among others, polydimethylsiloxane-polyoxyalkylene block copolymers available from the Union Carbide Corporation under the tradename "L-5420" and L-5340" and from the Dow Corning Corporation under the tradenames "DC-193" and "DC-195".

The surfactant generally comprises from 0.05 to 10, and preferably comprises from 0.1 to 6, weight percent of the phenolic composition. Non-ionic surfactants are generally preferred.

EXAMPLE 1

A structural laminate was produced according to this invention by contacting a mat of glass fibers with a foam-forming mixture. The mat of glass fibers was substantially incompressible and had an overall thickness of 0.030 inches. The glass fibers forming the mat were long, generally straight fibers having an average diameter of less than 25 microns and lengths varying from 5 to 12 feet with an average length of over 5 feet. The pull rolls were started, and the glass fiber mat was stretched by being passed through a pair of intermeshing corrugated rolls to effect a rupture of some of the fiber to fiber bonds. The ingredients of the foam-forming mixture were arranged in three tanks as follows:

In tank 11:

- polymethylenepolyphenyl isocyanate sold under the trademark "PAPI-20" from Upjohn Chemical Company—100 parts
- fluorotrichloromethane—18.8 parts
- polydimethylsiloxane polyoxyalkylene copolymers sold as L-5340 available from Union Carbide—2.16 parts In tank 12:

- diethylene glycol—8.3 parts

In tank 13:

- 2, 4, 6-tris (dimethylaminomethyl) phenol sold as DMP-30 from RoHm & Haas Company—0.84 part
- potassium-2-ethyl-hexoate—1.75 parts
- polyoxyethylene glycol (m.w. 200) sold as Carbowax 200 from Union Carbide Company—7.41 parts Pumps were operated to deliver the contents of the tanks 11, 12 and 13 to the mixing head 29 in a weight ratio of 100:6.87:3.04. This corresponds to an equivalent ratio of isocyanate to diethylene glycol of 4.6:1. The contents of tank 11 are maintained at 65° F., whereas the contents of tanks 12 and 13 are at 65°-75° F. The foam-forming mixture completely fills the interstices between the individual fibers of the glass fiber mat wetting the individual fibers of the glass fiber mat. Two facing sheets of aluminum foil, each having a thickness of about 0.0015 inches, are positioned one on each side of the glass fiber mat and foam-forming mixture, one of the facing sheets having an embossed decorative surface design. The facing sheets having the mat and foam-forming mixture therebetween then pass through the nip 34 of the two rotating rolls into oven 35 maintained at a temperature of 225° F. where the foam-forming mixture expands in the expansion zone 37 to a substantially uniform thickness of one inch, the glass fiber mat being included at the rate of 9.5 grams of glass fiber per board foot of laminate produced.

EXAMPLE 2

The following describes the synthesis of an alkylol group containing phenolic polymer composition.

| Item | Name | Quantity grams | gram-moles |
|---|---|---|---|
| A | ortho-cresol | 389 | 3.6 |
| B | HCHO (93.6% paraformaldehyde) | 144 | 4.5 |
| C | NaOH (50% solution) | 7.2 | 0.09 |
| D | HCHO | 121 | 3.8 |
| E | phenol | 338 | 3.6 |
| F | acetic acid | 6 | 0.1 |

Items A, B, and C are reacted at 90° C. for 4.75 hours in Step I to form a mixture. In Step II, items D and E are added to the mixture of Step I and the temperature is maintained at 90° C. for 2 hours. Then Item F is added to neutralize to a pH of 5.0 to 7.0 and the reaction products are cooled to room temperature.

EXAMPLE 3

The phenolic polymer of Example 2 is used to synthesize a cellular material.

The following quantities of the following ingredients are combined as indicated:

| Ingredients Item | Name | | Quantity grams |
|---|---|---|---|
| A | phenolic polymer | | 80 |
| B | phenol | | 11 |
| C | Catalyst | | |
| | p-toluene sulfonic acid | 4.3 | |
| | xylene sulfonic acid | 4.3 | 13 |
| | water | 4.3 | |
| D | $CFCl_3$ | | 10 |
| E | polydimethyl siloxane polyalkylene oxide block copolymer | | 2 |
| F | water | | 9 |

The phenolic composition is distributed to the three tanks. Tank 11 is charged with the phenolic polymer admixed with blowing agent, tank 12 with phenol and surfactant and tank 13 is charged with the catalyst.

The foam-forming mixture completely fills the interstices between the individual fibers of the glass fiber mat wetting the individual fibers of the glass fiber mat. Two facing sheets of aluminum foil, each having a thickness of about 0.0015 inches are positioned one on each side of the glass fiber mat and foam-forming mixture, one of the facing sheets having an embossed decorative surface design. The facing sheets having the mat and foam-forming mixture therebetween then pass through the nip 34 of the two rotating rolls into oven 35 maintained at a temperature of 225° F. The foam-forming mixture expands in the expansion zone 37 to a substantially uniform thickness of one inch, the glass fiber mat being included at the rate of 9.5 grams of glass fiber per board foot of laminate produced.

Although the invention has been described in considerable detail with reference to certain preferential embodiments thereof, it will be understood that variations and modifications can be effected within the spirit and scope of the invention as described above and as defined in the following claims.

What is claimed is:

1. A process for producing a structural laminate comprising the steps of:

I. contacting a thin, substantially incompressible yet expansible mat of glass fibers with a foam-forming mixture, II. positioning a facing sheet on at least one face of the mat, and III. passing the facing sheet, the mat and the foam-forming mixture through means for metering the amount of foam-forming mixture and causing it to fully penetrate between the fibers of said glass mat, the mat of glass fibers being further characterized by A. the glass fibers being arranged in layers, and B. the glass fibers within each layer being greater than one foot in length.

2. The process of claim 1 comprising the steps of:

I. contacting the thin, substantially incompressible yet expansible mat of glass fibers with the foam-forming mixture, II. positioning a facing sheet on each face of the mat, and III. passing the facing sheets having the mat and the foam-forming mixture therebetween through the means for metering the amount of foam-forming mixture and causing it to fully penetrate between the fibers of said glass mat.

3. The process of claim 1 wherein the means for metering the amount of foam-forming mixture and causing it to fully penetrate between the fibers of the glass mat comprises the nip of two rotating rolls.

4. The process of claim 3 wherein the mat of glass fibers has an initial thickness less than 1 and ½ times the separation of the facing sheets at the nip of the two rotating rolls.

5. The process of claim 2 wherein the glass fibers in each layer are at an angle to the glass fibers in each next adjacent layer.

6. The process of claim 5 comprising the steps of:

I. contacting a thin, substantially incompressible yet expansible mat of glass fibers with a foam-forming mixture, II. positioning a facing sheet on each face of the mat, and III. passing the facing sheets having the mat and the foam-forming mixture therebetween through means for metering the amount of foam-forming mixture and causing it to fully penetrate between the fibers of said glass mat, the mat of glass fibers being further characterized by A. the glass fibers being arranged in layers, B. the glass fibers within each layer being greater than one foot in length, and C. the glass fibers in each layer being at an acute angle to the glass fibers in each next adjacent layer, and IV. permitting the mat of glass fibers to expand under substantially the sole influence of the expansion of the foam-forming mixture.

7. The process of claim 6 wherein the layers of fibers in the mat maintain their same order but are distributed throughout the resultant structural laminate.

8. The process of claim 6 wherein the layers of fibers in the mat are evenly distributed throughout the structural laminate in planes substantially parallel to the planes of the facing sheets.

9. The process of claim 6 wherein the foam-forming mixture cures under the influence of heat added by the controlled introduction of hot air.

10. The process of claim 5 wherein the mat of glass fibers has a low loft such that pressure applied to the faces of the mat will not substantially reduce the thickness of the mat.

11. The process of claim 5 wherein the glass fibers of the mat are arranged in layers which are parallel to the faces of the mat.

12. The process of claim 5 wherein the glass fibers in each layer of the mat are at an angle of less than 60° to the glass fibers in each of the next adjacent layers.

13. The process of claim 5 wherein the glass fibers are attached to one another by an amount of fiber binder sufficient to make the mat of glass fibers dimensionally stable but insufficient to fill the interstices between the glass fibers.

14. The process of claim 5 wherein the glass fibers within each layer are substantially parallel to each other.

15. A process for producing a structural laminate comprising the steps of:

I. contacting a mat of glass fibers with a foam-forming mixture,

II. positioning a facing sheet comprising a metal on each face of the mat,

III. passing the facing sheets having the mat of glass fibers and the foam-forming mixture therebetween through means for metering the amount of foam-forming mixture and causing it to fully penetrate between the fibers of said glass mat, wherein:

A. the velocity of the mat is equal to the velocity of the facing sheets,

B. the glass fibers of the mat are arranged in layers,

C. the glass fibers within each layer are greater than one foot in length,

D. the glass fibers in each layer are at an angle to the glass fibers in each next adjacent layer, and E. the foam-forming mixture completely fills the interstices between the fibers of the mat, and IV. passing the facing sheets having the mat and the foam-forming mixture therebetween from the metering means into an expansion zone wherein the foam-forming mixture expands under the influence of heat generated in an exothermic reaction between the components of the foam-forming mixture, and the layers of fibers in the mat separate under the influence of the expansion of the foam-forming mixture.

16. The process of claim 15 wherein the thickness of the mat prior to passing through the metering means is less than 0.1 inches.

17. The process of claim 16 wherein the thickness of the mat prior to passing through the metering means is between 0.010 and 0.050 inches.

18. The process of claim 15 wherein the glass fibers have an average length that exceeds five feet.

19. The process of claim 15 wherein the glass fibers in each layer of the mat are at an acute angle to the glass fibers in each next adjacent layer.

20. The process of claim 15 wherein the glass fibers in each layer of the mat are at an angle of less than 60° to the glass fibers in each of the next adjacent layers.

21. The process of claim 15 wherein the glass fibers are attached to one another by an amount of fiber binder sufficient to make the mat of glass fibers dimensionally stable but insufficient to fill the interstices between the glass fibers and insufficient to resist the separation of the glass fibers under the influence of the expanding foam-forming mixture.

22. The process of claim 15 wherein the mat of glass fibers is included in the amount of 1–24 grams per board-foot of the resulting structural laminate.

23. The process of claim 15 wherein the glass fibers within each layer are substantially parallel to each other.

24. A process for producing a structural laminate comprising the steps of:

I. providing a thin, substantially incompressible yet expansible mat of glass fibers wherein:

A. the glass fibers are arranged in layers,

B. the glass fibers within each layer are greater than one foot in length,

C. the glass fibers are lightly bonded to each other at their intersections by means of interfiber bonds, and D. the mat of glass fibers has an indefinite running length, II. stretching the mat of glass fibers by an amount sufficient to rupture some of the interfiber bonds, and then III. contacting the mat with a foam-forming mixture, IV. positioning a facing sheet on each face of the mat, and V. passing the facing sheets having the mat and the foam-forming mixture therebetween through means for metering the amount of foam-forming mixture and causing it to fully penetrate between the fibers of said glass mat.

25. The process of claim 24 wherein the stretching of the mat of glass fibers is in a direction parallel to the running length of the glass mat and results in an elongation of 1 to 10% based on the length of the mat prior to stretching.

26. The process of claim 24 wherein the stretching is accomplished by passing the mat through two pairs of rotating rolls wherein:

A. the axes of the rolls are perpendicular to the running length of the mat,

B. the nip of each pair of rolls engages the mat, and

C. the peripheral speed of the second pair of rolls is greater than the peripheral speed of the first pair of rolls.

27. The process of claim 24 wherein the glass fibers within each layer are substantially parallel to each other.

28. The process of claim 24 wherein the glass fibers in each layer are at an angle to the glass fibers in each next adjacent layer.

29. The process of claim 24 wherein the layers of fibers in the mat separate under the influence of the expansion of the foam-forming mixture.

30. The process of claim 24 wherein the foam-forming mixture cures under the influence of heat added by the controlled introduction of hot air.

31. The process of claims 2, 6, 15, or 24 wherein the foam-forming mixture contains a foamable polymer selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone.

32. The process of claims 2, 6, 15, or 24 wherein the foam-forming mixture contains a foamable phenolic polymer.

* * * * *